INVENTORS.
A. F. DYER
E. E. REED

BY Hudson and Young

ATTORNEYS.

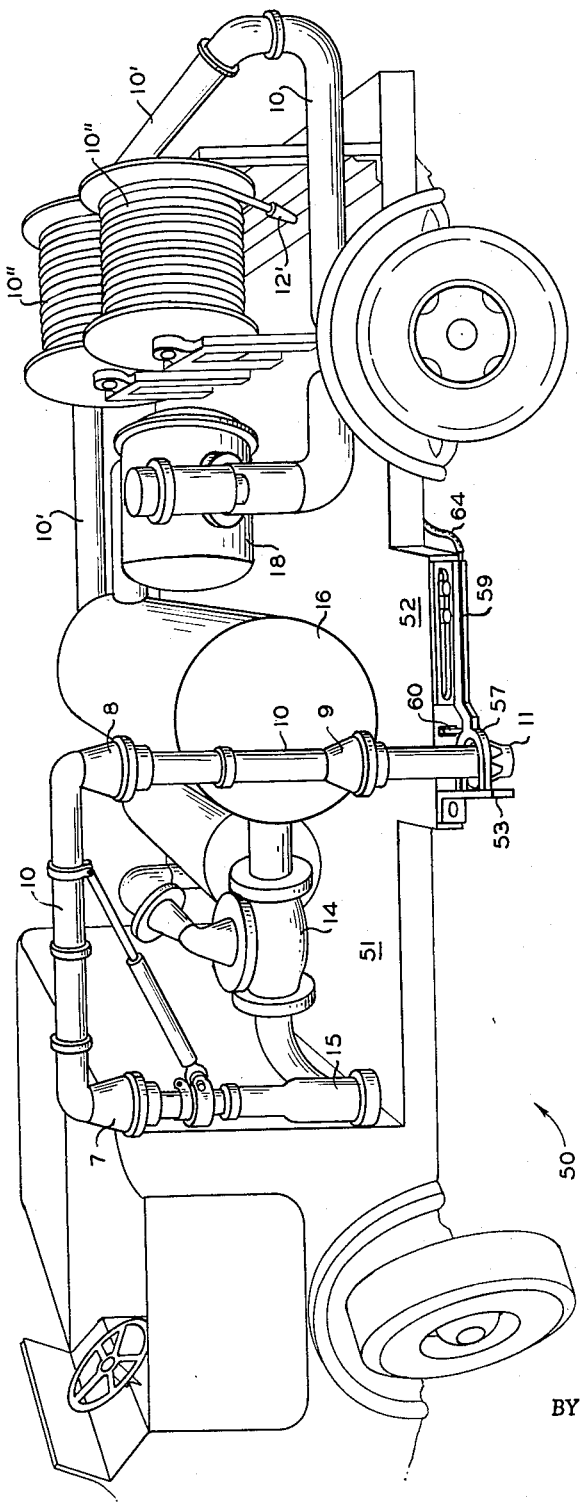

Nov. 15, 1960   A. F. DYER ET AL   2,960,106
LIQUID DISPENSING APPARATUS
Filed Sept. 11, 1957   4 Sheets-Sheet 4

INVENTORS.
A. F. DYER
E. E. REED
BY
Hudson and Young
ATTORNEYS.

United States Patent Office 2,960,106
Patented Nov. 15, 1960

2,960,106

LIQUID DISPENSING APPARATUS

Alvah F. Dyer, and Edwin E. Reed, Bartlesville, Okla., assignors to Phillips Petroleum Company, a corporation of Delaware Filed Sept. 11, 1957, Ser. No. 683,263

14 Claims. (Cl. 137—351)

This invention relates to liquid dispensing apparatus. In one aspect this invention relates to a mobile servicing vehicle adapted to be employed with a liquid dispensing and receiving system. In another aspect this invention relates to combinations of safety devices with said vehicle.

At the present time there is a trend to replace the familiar aircraft servicing tank truck with a fueling system comprising underground conduits supplying fuel from a central storage and pumping facility to a plurality of fuel hydrants located at parking stations on the air field. In such fueling systems mobile servicing trucks having metering and filtering means thereon, and provided with suitable connections which connect with said hydrants and the aircraft, are employed at said parking stations. The fuel is delivered from the hydrant through the metering and filtering means on the servicing truck and into the aircraft. In the past, said servicing trucks have usually comprised little more than a meter and hose cart having little or no flow control equipment thereon.

In the fueling of modern aircraft which carry large quantities of fuel it is important that the servicing truck (fueling and defueling vehicle) have adequate flow control equipment mounted thereon. Said large quantities of fuel are loaded at high rates which increases the chances of a major spill with consequent increased hazard of a major fire. With adequate control equipment mounted on the servicing vehicle, which control equipment is auxiliary to that at the source of fuel supply, the chances of a major spill are greatly reduced if not eliminated. In addition to said flow control equipment, it is important that the servicing vehicle be equipped with safety devices to render same non-mobile during fueling or defueling operations. The present invention provides a liquid dispensing apparatus which, while it can be employed in any liquid dispensing system, is particularly adapted to be mounted on and employed in combination with an aircraft fueling and defueling vehicle. For maximum safety the fueling and defueling vehicle should be rendered non-mobile during fueling or defueling operations. Therefore, the invention also provides combinations of safety devices with said vehicle, which when employed in combination with said flow control equipment greatly reduces, if not eliminates, the chance of a major accident.

An object of this invention is to provide liquid dispensing and receiving apparatus. Another object of this invention is to provide an improved mobile servicing vehicle. Still another object of this invention is to provide a liquid dispensing apparatus wherein flow of a liquid through a main flow conduit is controlled in accordance with the flow of said liquid through a control conduit. Yet another object of this invention is to provide a mobile fueling and defueling vehicle provided with one or more safety devices adapted to render said vehicle non-mobile during at least one of (1) fueling operations and (2) refueling operations. Other aspects, objects and advantages of the invention will be apparent to those skilled in the art in view of this disclosure.

Thus, according to the invention there is provided, a liquid dispensing apparatus combination wherein a main flow or fueling conduit has a pilot operated control valve disposed therein and a control conduit connected into said flow conduit upstream of and downstream from said control valve. Means disposed in said control conduit are provided for actuating said control valve to an open position responsive to the flow of liquid through said control conduit. Additional means disposed in said control conduit are provided for controlling the flow of liquid through said main flow conduit in accordance with the flow of said liquid through said control conduit.

Further according to the invention and in further combination, there is provided a mobile fueling and defueling vehicle having the above described combination of apparatus mounted thereon and provided with means for rendering said vehicle non-mobile during at least one of (1) fueling operations and (2) defueling operations.

Figure 3 is a perspective view illustrating a mobile fueling and defueling vehicle having the combinations of liquid dispensing apparatus illustrated in Figure 1 mounted thereon.

Figure 1:
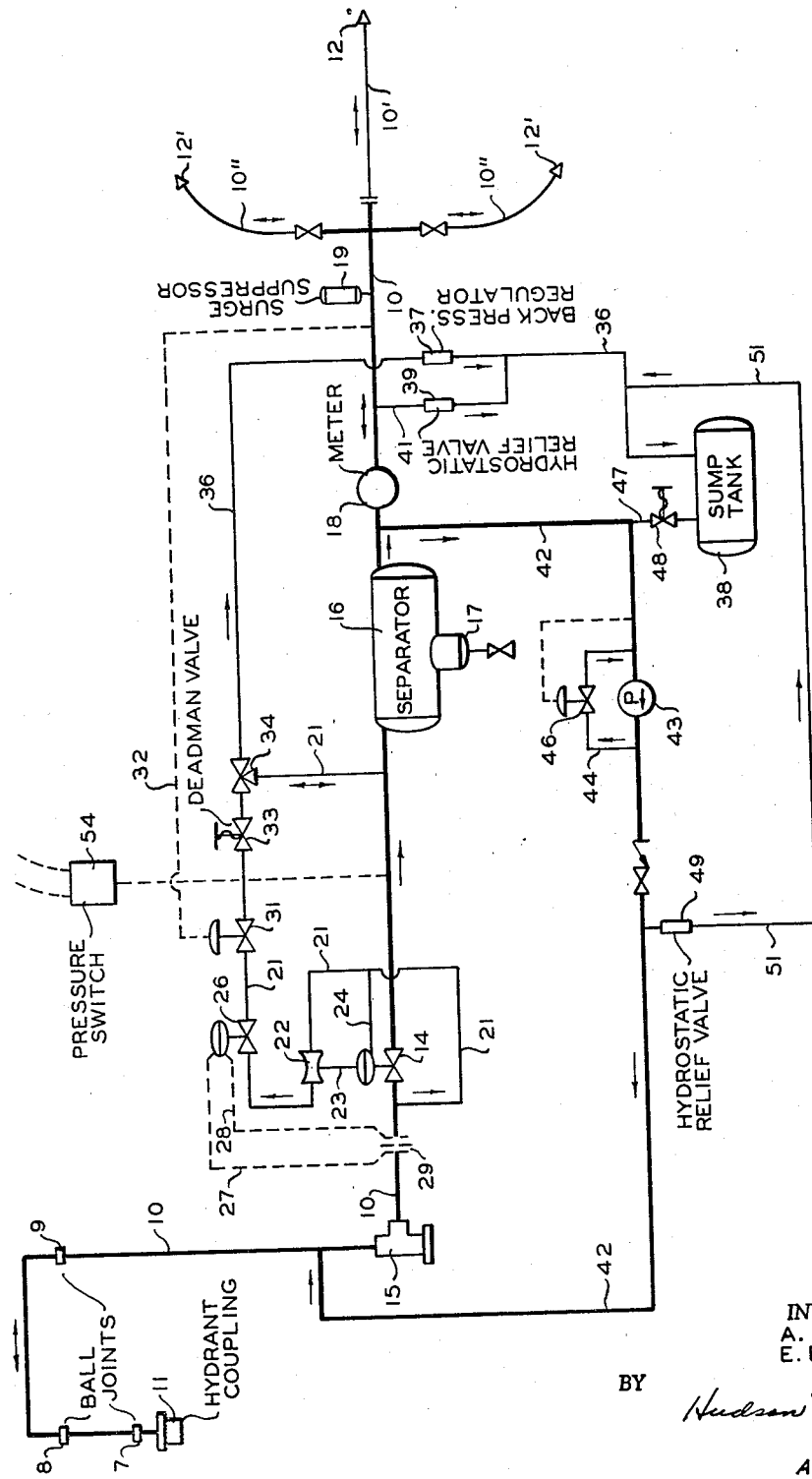
Figure 1 is a diagrammatic flow sheet illustrating schematically various combinations of liquid dispensing apparatus according to the invention.
Figure 2:
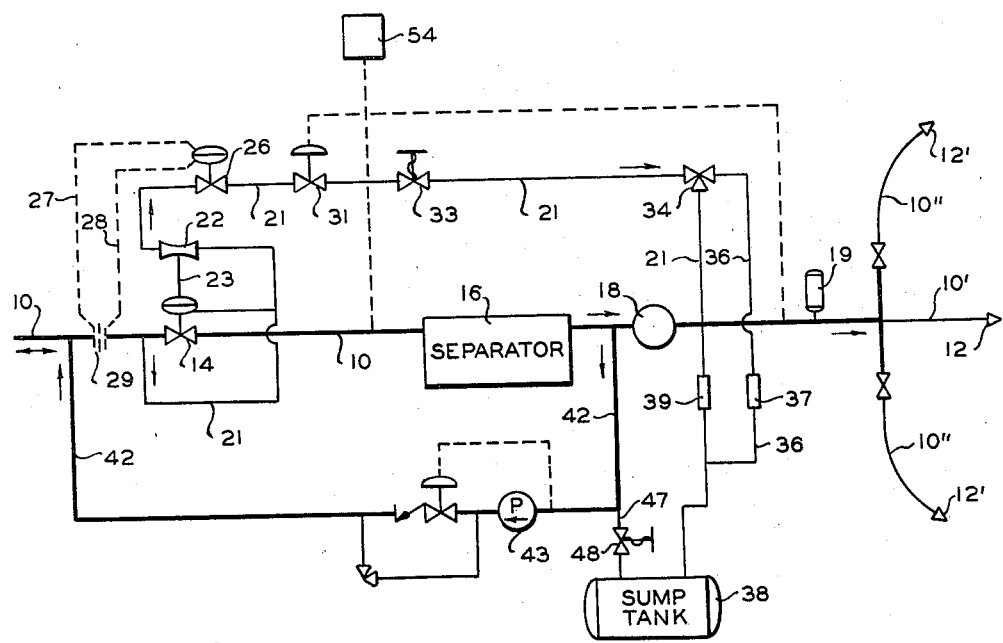
Figure 2 is a diagrammatic flow sheet illustrating a modification of the liquid dispensing apparatus shown in Figure 1.

Referring now to the drawings wherein like reference numerals have been employed to designate like elements of the apparatus, the invention will be more fully explained. It is to be understood that the flow sheets of the drawings are diagrammatic in nature. Many valves, pressure gauges, etc., not necessary for explaining the invention to those skilled in the art have been omitted so as to simplify said drawings. The individual elements shown in Figures 1 and 2 are commercially available conventional equipment. The invention there illustrated resides in the combinations and arrangements of said elements to obtain the improved results as described herein. It is also to be understood that Figures 3–8 inclusive are schematic in nature and are intended to illustrate various concepts of the invention broadly. From these illustrations, those skilled in the art can devise many specific combinations of apparatus.

Referring to Figure 1, there is provided a main flow or fueling conduit 10 adapted to be connected at one end by means of hydrant coupling 11 or other suitable means to a source of liquid supply. Said main flow conduit is adapted to be connected at its other end to a dispensing valve 12 provided at the end of single-point fueling hose 10', or 12' provided at the end of one of the over-the-wing fueling hoses 10". Hydrant coupling 11 can be any one of several suitable poppet type mating couplings which are available commercially. However, one presently preferred type of coupling is that disclosed and claimed in copending application, Serial No. 658,301, filed May 10, 1957 by E. E. Reed and A. F. Dyer.

A pilot operated first control valve 14 is disposed in said main flow conduit. If desired or necessary, a strainer 15 can be provided in said main flow conduit upstream of said first control valve. Separator means 16 is provided in said main flow conduit downstream of said first control valve. If desired, said separator means 16, can comprise a water separator tank having an automatic water drain valve 17 connected thereto as illustrated in Figure 1, or said separator means can comprise a filter as illustrated in Figure 2. In some instances, it may be desirable to combine said filter and water separator means i.e., the filtration means would be provided within separator 16. Meter means 18 is disposed in said main flow conduit downstream from said separator means 16. Surge suppressor 19 is provided to take care of surges in pressure in said main flow conduit 10 and this protects equipment on the aircraft to which the fuel is being supplied and also the dispensing apparatus.

A control conduit 21 is connected into said main flow conduit upstream of and downstream from said first control valve. A venturi 22 is disposed with its inlet and outlet connected into said control conduit. A conduit 23 connects the throat of said venturi with the upper diaphragm chamber of said first control valve 14. Another conduit 24 provides a connection between said control conduit 21 and the lower diaphragm chamber of said first control valve 14. A second control valve 26 is disposed in said control conduit 21 downstream from venturi 22. Pressure sensing conduit 27 extends from the upstream side of orifice 29 disposed in main flow conduit 10 to the upper diaphragm chamber of said second control valve 26. Pressure sensing conduit 28 extends from the downstream side of said orifice 29 to the lower diaphragm chamber of said second control valve 26.

A third control valve 31 is disposed in said control conduit downstream from said second control valve 26. A pressure sensing conduit 32 extends from the diaphragm chamber of said control valve 31 to a point in said main flow conduit 10 downstream of said meter 18. A normally closed, spring-loaded "deadman" valve 33 is disposed in said control conduit 21 downstream from said third control valve 31. Three-way valve 34 provides a connection between said control conduit 21 and low pressure release conduit 36 having pressure regulator 37 therein and extending in sump tank 38. Hydrostatic relief valve 39 in conduit 41 provides means for releasing excess pressure from main flow conduit 10 into sump tank 38 via conduit 36.

It will be understood that control conduit 21 is relatively small as compared to main flow or fueling conduit 10. For example, fueling conduit 10 can be a six inch conduit and control conduit 21 can be a ⅜ to ½ inch conduit.

A defueling conduit 42 is connected to said main flow conduit 10 at a point between separator 16 and meter 18 and is connected at its other end into said main fueling conduit 10 at a point upstream from said first control valve 14. Defueling pump 43 is provided in said defueling conduit 42. By-pass conduit 44 having control valve 46 therein is provided to prevent vapor lock of said pump 43. Connecting conduit 47, having normally closed, spring-loaded sump pump out valve 48 therein, is provided between said defueling conduit 42 and said sump tank 38. Excess pressure in defueling conduit 42 can be released via hydrostatic valve 49 and conduit 51 into said sump tank 38.

The flow illustrated in Figure 2 is essentially the same as that illustrated in Figure 1 except that control conduit 21 is connected into said main flow conduit 10 at a point downstream from said meter 18. This is a presently less preferred embodiment of the invention in that liquid flowing through said control conduit 21 thus by-passes separator 16 and meter 18.

The apparatus illustrated by the flow diagram can be employed in any liquid dispensing system to which it is adapted. However, it is particularly well adapted to be mounted on a mobile vehicle as illustrated in Figure 3 and employed in the fueling and defueling of aircraft. In operation, when it is desired to fuel an aircraft, said main flow of fueling conduit 10 is connected by means of coupling 11 to a hydrant on the loading ramp and to the aircraft by means of nozzle 12 on single point fueling hose 10' or the nozzle 12' on one of the over-the-wing hoses 10". When the valve on the outlet of the hose being employed is opened, pressure will drop in fueling conduit 10 and also in control conduit 21. At this time spring-loaded deadman valve 33 is opened, permitting flow through control conduit 21. Said flow is through venturi 22 and thus reduces the pressure in conduit 23 and the upper diaphragm chamber of first control valve 14 which causes said valve 14 to open and permit flow through fueling conduit 10, separator 16, and meter 18 to the aircraft being fueled. Third control valve 31 senses the pressure in fueling conduit 10 downstream of meter 18 by means of sensing conduit 32 and regulates the pressure in fueling conduit 10 by permitting more flow through control conduit 21 when the pressure is low in fueling conduit 10. Since more flow through control conduit 21 will further decrease the pressure in the upper diaphragm chamber of first control valve 14, said control valve 14 will be opened further and thus increase the flow of fuel through said valve 14 and fueling conduit 10. Conversely, if the pressure in fueling conduit 10 is higher than the desired operating pressure, third control valve 31 will decrease the flow through control conduit 21 which will, in turn, throttle valve 14 and decrease the flow through fueling conduit 10. However, if the volume of liquid flowing through fueling conduit 10 exceeds a predetermined maximum, or falls below a predetermined minimum the differential pressure across orifice 29 transmitted through conduits 27 and 28 to second control valve 26 will actuate said valve 26 to decrease, or increase the amount of fuel flowing through control conduit 21. If spring-loaded "deadman" valve 33 is released it closes automatically and thus causes first control valve 14 to close because flow through venturi 22 has been stopped. An excess of pressure in fueling conduit 10 will bleed through hydrostatic release valve 39 and conduit 36 into sump tank 38.

Normally, when the fueling operation ceases, three-way valve 34 is manually switched to connect fueling conduit 10 with conduit 36 which will permit the operating pressure to bleed through back pressure regulator 37 into said sump tank 38. In this manner pressure is removed from the dispensing hoses facilitating their removal from the aircraft. Sump tank 38 can then be pumped out by manually holding pump out valve 48 open and starting defueling pump 43 which is driven by the vehicle motor through power take-off gear box 86 shown in Figure 7. The fuel in said sump tank is transferred via conduit 42 into conduit 10 which is connected to one of the hydrants as previously described.

When it is desired to defuel an aircraft, connection to a hydrant by coupling 11 and to the aircraft by means of one of the hoses is made, as described above, and defueling pump 43 is started. Said pump takes suction from the aircraft tanks and moves the fuel through conduit 10, meter 18, conduit 42, and discharges it into conduit 10 at a point upstream from first control valve 14.

Figure 3 illustrates one arrangement of the major pieces of the apparatus described in connection with the the description of the flow diagrams of Figures 1 and 2. Said apparatus is mounted on bed 51 of a vehicle 50. Said bed 51 has a projection 52 extending therefrom. In Figure 3 the apparatus is in traveling position with fuel conduit 10 and coupling 11 positioned and held adjacent to said projection 52 by means of guard bar 53 and yoke-like member 57. Over-the-wing fueling hoses 10" are shown mounted on reels. Nozzle 12' is shown at the end of one of said over-the-wing hoses. Single point fueling hose 10' extends around said vehicle to the back side thereof and the fueling nozzle valve 12 is not shown. Ball joints 7, 8, and 9 render the upstream end of fueling conduit 10 flexible to facilitate its connection to a hydrant (not shown).

Figure 4:
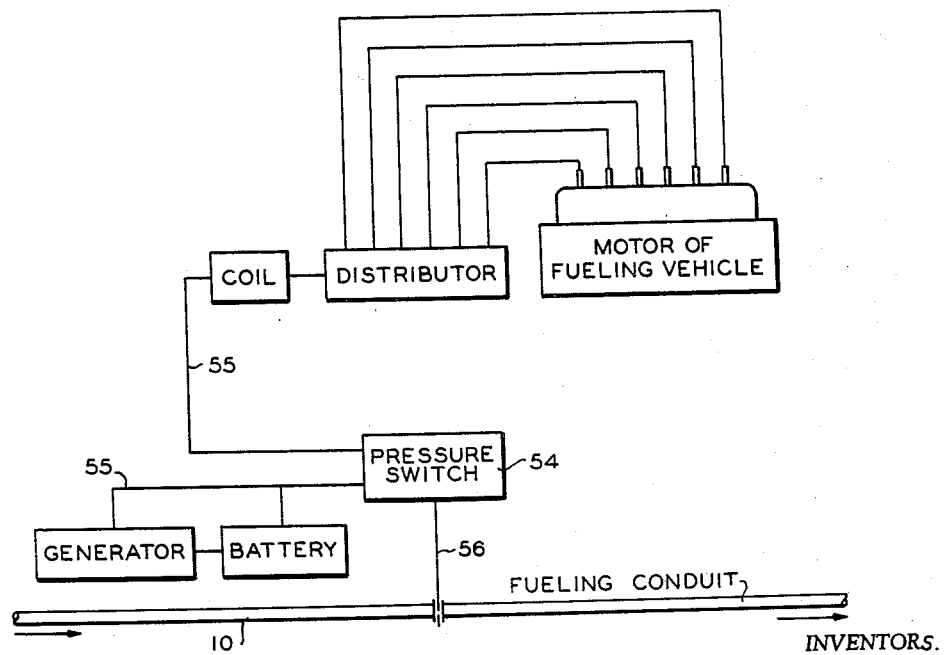
Figure 4 is a schematic illustration of one modification of the invention wherein a pressure switch operatively connected into the fueling conduit is employed to break the ignition circuit and render the mobile fueling unit non-mobile when the pressure in said fueling conduit exceeds a predetermined value.

In Figure 4 pressure switch 54 is disposed in the ignition circuit 55 of vehicle 50 and is operatively connected by means of conduit 56 to main flow or fueling conduit 10. In operation, pressure switch 54, upon the pressure in fueling conduit 10 reaching a predetermined maximum value opens, breaking the ignition circuit 55 of vehicle 50, thus preventing operation of the motor of said vehicle during a fueling operation.

Figure 5:
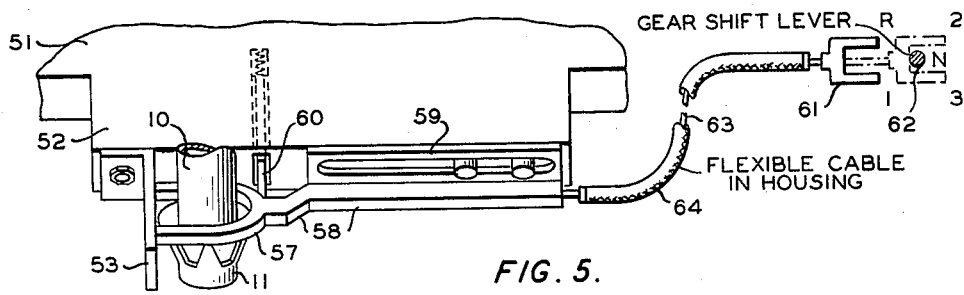
Figure 5 is a schematic illustration of another modification of the invention wherein means are provided which require that the fueling conduit on the mobile fueling vehicle be in traveling position before the gear shift lever on said fueling vehicle can be operated.

In Figure 5 there is illustrated another means for rendering vehicle 50 non-mobile when it is not in traveling condition. A yoke-like member 57 comprising a bar 58 having a bifurcated end is attached to slide member 59 which is slidably mounted on projection 52. Said yoke-like member 57 is adapted to engage the end of fueling conduit 10 at a point adjacent coupling 11. A second yoke-like or U-shaped member 61 is slidably mounted on said vehicle adjacent gear shift lever 62 and is adapted to engage said gear shift lever only when it is in the neutral position. A flexible cable 63 mounted in a guide housing 64 extends between said yoke-like member 57 and said second yoke-like member 61. Said flexible cable is of such length that only one of said first and said second yoke-like members can be engaged at any one time. Thus in operation, when the fueling vehicle is driven to an aircraft parking station for starting fueling operations, the gear shift lever 62 will be placed in neutral position upon stopping the vehicle and yoke-like member 57 will be disengaged from conduit 10 by sliding member 59 to the right. This automatically causes yoke-like member 61 to engage said gear shift lever as shown by the dotted lines and thus make it impossible to drive the vehicle while fueling conduit 10 is not in traveling position. If the operator fails to put the gear shift lever in neutral position he will not be able to move and connect fueling conduit 10 to a hydrant. Spring actuated guard bar 60, mounted in a recess of projection 52, upon withdrawal of yoke-like member 57 emerges to a position parallel with guard bar 53 and prevents disengagement of yoke-like member 61 from gear shift lever 62 accidentally, or until said bar 60 is pressed into projection 52.

Figure 6:
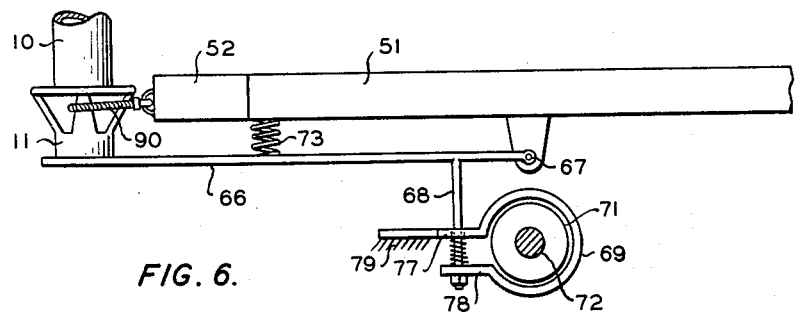
Figure 6 is a schematic illustration of still another modification of the invention for rendering said vehicle non-mobile by requiring that the fueling conduit be in traveling position so as to release a brake mounted on the drive shaft of said vehicle.

In Figure 6 there is illustrated another means for rendering vehicle 50 non-mobile when fueling conduit 10 is not in traveling position. A lever bar 66 is pivotally connected at 67 to the under side of bed 51 and extends from underneath said bed. A rod 68 is attached to said lever bar 66 at one end, extends through fixed ear 77, and is operatively connected at its other end to ear 78 of brake band 69 surrounding a brake drum 71 mounted on the drive shaft 72 of said vehicle 50. Fixed ear 77 can be fixed to the frame, bed 51, or any other convenient spot on vehicle 50. When fueling conduit 10 is in traveling position adjacent projection 52, coupling 11 rests on the extended end of lever member 66 holding same in a downward position and thus releases brake band 69 from contact with brake drum 71 and vehicle 50 is free to move. When fueling conduit 10 is removed from its traveling position preparatory to being connected to a source of fuel supply, tension spring 73 causes lever member 66 to be biased upwardly and thus bring brake band 69 into contact with brake drum 71 which will prevent movement of vehicle 50 so long as conduit 10 and coupling 11 are out of engagement with lever member 66, i.e., not in traveling position.

Figure 7:
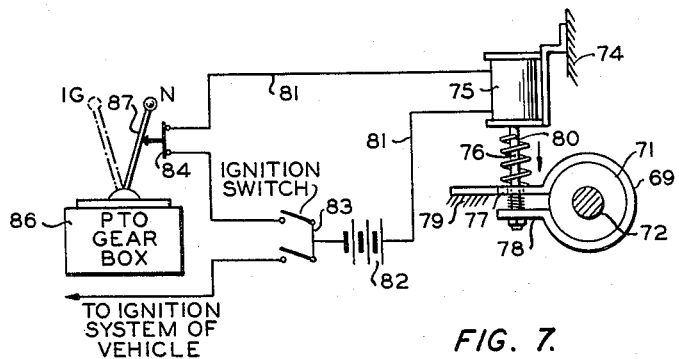
Figure 7 is a schematic illustration of another modification of the invention for rendering said vehicle non-mobile wherein it is required that the power take-off gears be in neutral position in order to release a brake mounted on the drive shaft of said vehicle.

The combination of apparatus in Figure 7 provides still other means for rendering vehicle 50 non-mobile during fueling or defueling operations. In Figure 7 a solenoid 75 is mounted on vehicle 50 at a convenient point 74 (such as a point on the frame or bed 51) adjacent brake band 69. The core rod 76 of said solenoid 75 extends through fixed ear 77 of brake band 69 and is connected to lower ear 78 of said brake band. Said fixed ear 77 is connected to the frame or bed 51 of said vehicle at a convenient point 79. A first circuit 81 connects said solenoid 75 with battery 82 and ignition switch 83 of vehicle 50. A second switch 84 is disposed in said circuit 81 and is adapted to be actuated to a closed position when the power take-off gears in power take-off gear box 86 are in neutral position. As shown in Figure 7, said switch 84 would be mounted adjacent the PTO gear shift lever 87 and when said gear shift lever is in the neutral position, as shown, would engage said switch 84 causing it to be in the closed position shown. Obviously, said switch 84 could be located within gear box 86. Figure 7 is intended to be a schematic illustration only. Those skilled in the art can devise other suitable arrangements of the apparatus illustrated in view of this disclosure. In operation of the apparatus, as here illustrated with the power take-off gears in neutral position and with the engine of vehicle 50 not running, solenoid 75 is not energized and the brake band 69 is set by the action of spring 80, attached to core rod 76 and bearing against fixed ear 77, causing core rod 76 to be retracted. When gear shift lever 87 is moved to the in-gear position, as shown by the dotted lines, such as it would be when the power take-off was being operated to furnish power to drive defueling pump 43, and with ignition switch 83 closed, circuit 81 will be broken. Solenoid 75 will then be de-energized causing core rod 76 to be retracted and thus set brake band 69 on brake drum 71. In this manner the brake is set during operation of the power take-off to drive defueling pump 43 and it is possible to operate the engine to the vehicle with the vehicle rendered non-mobile. Similarly, with gear shift lever 87 in neutral position closing switch 84, and with ignition switch 83 closed as in normal driving, solenoid 75 is energized causing core rod 76 to be extended and the brake is released.

Figure 8:
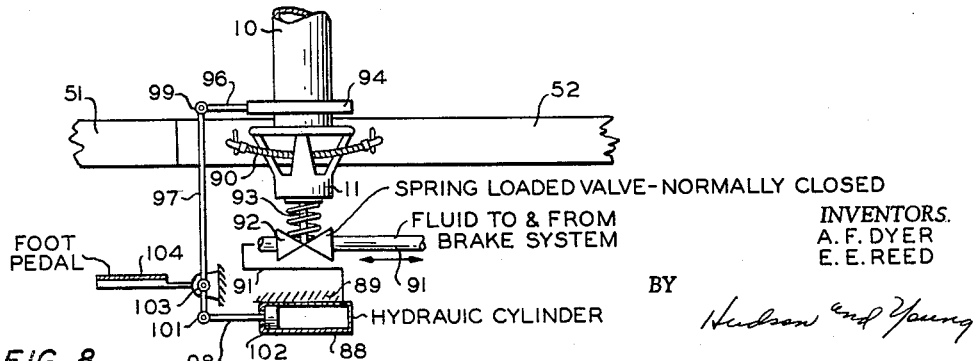
Figure 8 is a schematic illustration of another modification of the invention for rendering said vehicle non-mobile wherein it is required that the fueling conduit on said vehicle be in traveling position in order to release the brakes on said vehicle.

Figure 8 is a schematic illustration of another means for rendering vehicle 50 non-mobile when fueling conduit 10 is not in traveling position adjacent projection 52. In Figure 8 a hydraulic cylinder 88 is mounted at a convenient point 89 (to the frame or bed 51) on vehicle 50. A hydraulic conduit 91 connects said hydraulic cylinder 88 and the brake system of vehicle 50. A spring-loaded, normally closed valve 92 is disposed in said hydraulic conduit 91 adjacent to and below coupling 11 in a manner such that said coupling is adapted to rest on the stem 93 of said valve, and thus bias the valve to an open position when fueling conduit 10 is in traveling position. A yoke-like member 94, comprising a rod having a bifurcated end, is adapted to engage said fueling conduit 10 when it is in the traveling position. Lever members 96, 97, and 98 are pivotally connected at 99 and 101. Said lever member 96 is attached to yoke-like member 94 and said lever member 98 is attached to piston 102 in hydraulic cylinder 88. Lever member 97 is pivotally connected at an intermediate point 103 to said vehicle. Foot pedal 104 is also connected to said lever member 97 at intermediate point 103. Cable 90, detachably connected to projection 52, serves to hold fueling conduit 10 and coupling 11 in traveling position.

In operation of the apparatus illustrated in Figure 8, when it is desired to connect coupling 11 to a hydrant or other source of fuel supply, foot pedal 104 is depressed, causing yoke member 94 to be withdrawn from engagement with conduit 10, and piston 102 will be forced into cylinder 88, forcing hydraulic fluid through conduit 91 to the brakes of vehicle 50, thus setting said brakes and rendering vehicle 50 non-mobile. Then, when conduit 10 and coupling 11 are removed from engagement with stem 93 of valve 92, said valve will close, thus trapping hydraulic fluid in conduit 91 and said brakes will remain set until stem 93 is depressed as by returning conduit 10 and coupling 11 to the traveling position. While the lever system which actuates yoke-like member 94 and piston 102 has been shown as comprised of lever members 96, 97, 98 and foot pedal 104, it will be understood that any other suitable lever system is within the scope of the invention. Said lever system can be varied depending upon the point of mounting cylinder 88 on vehicle 50. The only requirement is that the lever system, when actuated, will disengage yoke member 94 and move piston 102 inwardly in cylinder 88.

The many advantages of the invention will be apparent to those skilled in the art in view of the above disclosure. For example, some of these advantages, are as follows. In the liquid dispensing apparatus illustrated in Figures 1 and 2, which can be employed in any liquid dispensing system, a simple yet highly effective flow control system has been provided. If desired, only that portion of the system including venturi 22, "deadman" valve 33, and first control valve 14 can be employed to initiate and maintain flow through main flow or fueling conduit 10. If a more complete system of control is desired, second control valve 26, operated by the differential pressure across orifice 29 in main flow conduit 10, can be employed to maintain the volume of liquid flowing through said main flow conduit within a predetermined range. If a still more complete system of flow control is desired, third control valve 31 can be employed to control the pressure in main flow conduit 10 within a predetermined range, consistent with the range of volume control effected by second control valve 26 and the designed size of the equipment. In cases of extreme high pressure in main flow conduit 10, such as would be caused by the blocking of said conduit, third control valve 31 will override second control valve 26 and operate to close first control valve 14. Deadman valve 33 provides a simple, yet very effective means for manually stopping flow in case of an emergency.

The advantages of the combinations of vehicle 50 with the safety devices illustrated in Figures 3-8 inclusive, which operate to render the fueling and defueling vehicle non-mobile during one of (1) a fueling operation or (2) a defueling operation, are believed obvious in view of the disclosure and need no further discussion.

While the invention has been described in connection with an application to a fueling and defueling vehicle, it will be realized by those skilled in the art that the dispensing apparatus and system of controls illustrated in Figures 1 and 2 are not necessarily limited to use on a mobile fueling and defueling vehicle. Said combination can be employed in any dispensing system.

Various other modifications of the invention can be made, or followed, by those skilled in the art, in view of the above disclosure. Such modifications are believed to be within the scope and spirit of the invention.

We claim:

1. In liquid dispensing apparatus, the fueling and defueling combination comprising: a fueling conduit adapted to be connected at one end to a source of fuel supply and at the other end to a dispensing valve; a pilot operated first control valve disposed in said fueling conduit; separating means disposed in said fueling conduit; flow meter means disposed in said fueling conduit downstream from said separator means; a control conduit connected into said fueling conduit upstream of and downstream from said first control valve; a venturi disposed in said control conduit, operatively connected at its throat to the pilot of said first control valve; a second control valve disposed in said control conduit downstream from said venturi, operatively connected to and responsive to the pressure drop across an orifice disposed in said fueling conduit upstream of said first control valve; a third control valve disposed in said control conduit downstream from said second control valve, operatively connected to a pressure sensing conduit connected into said fueling conduit downstream from said flow meter; a defueling conduit connected at one end to said fueling conduit at a point between said separator means and said flow meter means, and connected at the other end to said fueling conduit at a point upstream of said orifice; a defueling pump disposed in said defueling conduit; a sump tank; a connecting conduit between said defueling conduit and said sump tank; and a pressure relief conduit extending between said fueling conduit and said sump tank.

2. A combination of claim 1 wherein said control conduit is connected into said fueling conduit at a point downstream from said flow meter means.

3. In liquid dispensing apparatus adapted for carrying out fueling operations and also adapted for carrying out defueling operations, the combination comprising: a mobile fueling and defueling vehicle having a self-contained propulsion means; a fueling conduit mounted on said vehicle and adapted to be connected at its upstream end by means of a coupling to a source of fuel supply and at its downstream end to a dispensing valve; a pilot operated first control valve disposed in said fueling conduit; a control conduit connected into said fueling conduit upstream of and downstream from said first control valve; means disposed in said control conduit for actuating said first control valve to an open position responsive to the flow of fuel through said control conduit; a second control valve disposed in said control conduit downstream from said means for actuating said first control valve and adapted to maintain the flow of fuel through said fueling conduit below a predetermined maximum responsive to the pressure drop across an orifice disposed in said fueling conduit upstream of said first control valve; a defueling conduit connected at one end to said fueling conduit at a point downstream from said control conduit, and connected at its other end to said fueling conduit upstream of said orifice; means for securing said upstream end of said fueling conduit in traveling position; and means, operatively coactive with and operable only when said upstream end of said fueling conduit is not in said traveling position, for rendering said vehicle non-mobile.

4. The combination of claim 3 wherein said means for rendering said vehicle non-mobile comprises: a first yoke-like member slidably mounted on a projection of the bed of said vehicle and adapted to engage said upstream end of said fueling conduit only when said fueling conduit is in traveling position; a second yoke-like member slidably mounted adjacent the gear shift lever of said vehicle and adapted to engage said gear shift lever only when it is in neutral position; and a flexible cable, mounted in a guide housing, attached at one end to said first yoke-like member and at the other end to said second yoke-like member, the length of said cable being such that only one of said yoke-like members can be engaged at any one time.

5. The combination of claim 3 wherein said means for rendering said vehicle non-mobile comprises: a lever bar pivotally connected to the underside of the bed of said vehicle and extending from beneath said vehicle into engagement with said coupling on said fueling conduit when said fueling conduit is in traveling position; a rod attached to said lever bar and operatively connected to a brake band surrounding a brake drum mounted on the driveshaft of said vehicle; and means for biasing said lever bar upwardly when said coupling is removed from engagement therewith.

6. The combination of claim 3 wherein said means for rendering said vehicle non-mobile comprises: a hydraulic cylinder mounted on said vehicle and having a piston therein; a hydraulic conduit connecting said cylinder and the brake system of said vehicle; a spring-loaded, normally-closed valve disposed in said hydraulic conduit adjacent to and below said coupling on said fueling conduit, said coupling being adapted to rest on said valve and bias same to an open position when said fueling conduit is in traveling position; a yoke-like member adapted to engage said fueling conduit when said fueling conduit is in traveling position; a system of pivotally joined lever members connecting said piston and said yoke-like member, one of said lever members being pivotally connected at an intermediate point to said vehicle; and means for actuating said lever systems so as to force said piston into said cylinder and simultaneously disengage said yoke-like member from said fueling conduit.

7. In liquid dispensing apparatus adapted for carrying out fueling operations and also adapted for carrying out defueling operations, the combination comprising: a mobile fueling and defueling vehicle having a self-contained propulsion means; a fueling conduit mounted on said vehicle and adapted to be connected at one end by means of a coupling to a source of fuel supply and at the other end to a dispensing valve; a pilot operated first control valve disposed in said fueling conduit; a control conduit connected into said fueling conduit upstream of and downstream from said first control valve; means disposed in said control conduit for actuating said first control valve to an open position responsive to the flow of fuel through said control conduit; a second control valve disposed in said control conduit adapted to maintain the flow of fuel through said fueling conduit below a predetermined maximum responsive to the pressure drop across an orifice disposed in said fueling conduit upstream of said first control valve; a defueling conduit connected at one end to said fueling conduit at a point downstream from said control conduit, and connected at the other end to said fueling conduit upstream of said orifice; a first yoke-like member slidably mounted on a projection of the bed of said vehicle and adapted to engage said coupling on said fueling conduit only when said fueling conduit is in traveling position; a second yoke-like member slidably mounted adjacent the gear shift lever of said vehicle and adapted to engage said gear shift lever only when it it in neutral position; and a flexible cable, mounted in a guide housing, attached at one end to said first yoke-like member and at the other end to said second yoke-like member, the length of said cable being such that only one of said yoke-like members can be engaged at any one time.

8. In liquid dispensing apparatus adapted for carrying out fueling operations and also adapted for carrying out defueling operations, the combination comprising: a mobile fueling and defueling vehicle having a self-contained propulsion means; a fueling conduit mounted on said vehicle and adapted to be connected at one end by means of a coupling to a source of fuel supply and at the other end to a dispensing valve; a pilot operated first control valve disposed in said fueling conduit; a control conduit connected into said fueling conduit upstream of and downstream from said first control valve; means disposed in said control conduit for actuating said first control valve to an open position responsive to the flow of fuel through said control conduit; a second control valve disposed in said control conduit adapted to maintain the flow of fuel through said fueling conduit below a predetermined maximum responsive to the pressure drop across an orifice disposed in said fueling conduit upstream of said first control valve; a defueling conduit connected at one end to said fueling conduit at a point downstream from said control conduit, and connected at the other end to said fueling conduit upstream of said orifice; a lever bar pivotally connected to the underside of the bed of said vehicle and extending from beneath said vehicle into engagement with said coupling on said fueling conduit when said fueling conduit is in traveling position; a rod attached to said lever bar and operatively connected to a brake band surrounding a brake drum mounted on the driveshaft of said vehicle; and means for biasing said lever bar upwardly when said coupling is removed from engagement therewith.

9. In liquid dispensing apparatus adapted for carrying out fueling operations and also adapted for carrying out defueling operations, the combination comprising: a mobile fueling and defueling vehicle having a self-contained propulsion means; a fueling conduit mounted on said vehicle and adapted to be connected at one end by means of a coupling to a source of fuel supply and at the other end to a dispensing valve; a pilot operated first control valve disposed in said fueling conduit; a control conduit connected into said fueling conduit upstream of and downstream from said first control valve; means disposed in said control conduit for actuating said first control valve to an open position responsive to the flow of fuel through said control conduit; a second control valve disposed in said control conduit adapted to maintain the flow of fuel through said fueling conduit below a predetermined maximum responsive to the pressure drop across an orifice disposed in said fueling conduit upstream of said first control valve; a defueling conduit connected at one end to said fueling conduit at a point downstream from said control conduit, and connected at the other end to said fueling conduit upstream of said orifice; a hydraulic cylinder mounted on said vehicle and having a piston therein; a hydraulic conduit connecting said cylinder and the brake system of said vehicle; a spring loaded, normally-closed valve disposed in said hydraulic conduit adjacent to and below said coupling on said fueling conduit, said coupling being adapted to rest on said valve and bias same to an open position when said fueling conduit is in traveling position; a yoke-like member adapted to engage said fueling conduit when said fueling conduit is in traveling position; a system of pivotally joined lever members connecting said piston and said yoke-like member, one of said lever members being pivotally connected at an intermediate point to said vehicle; and means for actuating said lever systems so as to force said piston into said cylinder and simultaneously disengage said yoke-like member from said fueling conduit.

10. In liquid dispensing apparatus adapted for carrying out fueling operations and also adapted for carrying out defueling operations, the combination comprising: a mobile fueling and defueling vehicle having a self-contained propulsion means; a fueling conduit mounted on said vehicle and adapted to be connected at one end by means of a coupling to a source of fuel supply and at the other end to a dispensing valve; a pilot operated first control valve disposed in said fueling conduit; a control conduit connected into said fueling ocnduit upstream of and downstream from said first control valve; means disposed in said control conduit for actuating said first control valve to an open position responsive to the flow of fuel through said control conduit; a second control valve disposed in said control conduit adapted to maintain the flow of fuel through said fueling conduit below a predetermined maximum responsive to the pressure drop across an orifice disposed in said fueling conduit upstream of said first control valve; a hydraulic cylinder mounted on said vehicle and having a piston therein; a hydraulic conduit connecting said cylinder and the brake system of said vehicle; a spring-loaded, normally-closed valve disposed in said hydraulic conduit adjacent to and below said coupling on said fueling conduit, said coupling being adapted to rest on said valve and bias same to an open position when said fueling conduit is in traveling position; a yoke-like member adapted to engage said fueling conduit when said fueling conduit is in traveling position; a system of pivotally joined lever members connecting said piston and said yoke-like member, one of said lever members being pivotally connected at an intermediate point to said vehicle; and means for actuating said lever systems so as to force said piston into said cylinder and simultaneously disengage said yoke-like member from said fueling conduit.

11. In liquid dispensing apparatus, the fueling and defueling combination comprising: a fueling conduit adapted to be connected at one end to a source of fuel supply and at the other end to a dispensing valve; a pilot operated first control valve disposed in said fueling conduit; a control conduit connected into said fueling conduit upstream of and downstream from said first control valve; a venturi disposed in said control conduit, operatively connected at its throat to the pilot of said first control valve; a second control valve disposed in said control conduit downstream from said venturi, operatively connected to and responsive to the pressure drop across an orifice disposed in said fueling conduit upstream of said first control valve; a third control valve disposed in said control conduit downstream from said second control valve, operatively connected to a pressure sensing conduit connected into said fueling conduit downstream from said control conduit; a defueling conduit connected at one end to said fueling conduit at a point downstream from said control conduit, and connected at the other end to said fueling conduit at a point upstream of said orifice; a defueling pump disposed in said defueling conduit; a sump tank; a connecting conduit between said defueling conduit and said sump tank; and a pressure relief conduit extending between said fueling conduit and said sump tank.

12. In liquid dispensing apparatus, the combination comprising: a main flow conduit adapted to be connected at one end to a source of liquid supply and at the other end to a dispensing valve; a pilot operated first control valve disposed in said main flow conduit; a control conduit connected into said main flow conduit upstream of and downstream from said first control valve; a venturi disposed in said control conduit, operatively connected at its throat to the pilot of said first control valve, and adapted to actuate said first control valve to an open position responsive to the flow of liquid through said control conduit and said venturi, thereby permitting flow of liquid through said main flow conduit; a second control valve disposed in said control conduit downstream from said venturi, operatively connected to and responsive to the pressure drop across an orifice disposed in said main flow conduit upstream of said first control valve, and adapted to maintain the volume of liquid flowing through said main flow conduit below a predetermined maximum by controlling the volume of liquid flowing through said control conduit responsive to said pressure drop across said orifice; and a normally open third control valve disposed in said control conduit downstream from said second control valve, operatively connected to a pressure sensing conduit connected into said main flow conduit downstream from said control conduit, and adapted to maintain the pressure in said main flow conduit within a predetermined range by controlling the volume of liquid flowing through said control conduit responsive to the pressure in said main flow conduit.

13. The combination of claim 12 including, in further combination: a normally closed spring-loaded deadman valve disposed in said control conduit.

14. In liquid dispensing apparatus, the fueling and defueling combination comprising: a fueling conduit adapted to be connected at one end to a source of fuel supply and at the other end to a dispensing valve; a pilot operated first control valve disposed in said fueling conduit; a control conduit connected into said fueling conduit upstream of and downstream from said first control valve; a venturi disposed in said control conduit, operatively connected at its throat to the pilot of said first control valve; a second control valve disposed in said control conduit downstream from said venturi, operatively connected to and responsive to the pressure drop across an orifice disposed in said fueling conduit upstream of said first control valve; a third control valve disposed in said control conduit downstream from said second control valve, operatively connected to a pressure sensing conduit connected into said fueling conduit downstream from said control conduit; a defueling conduit connected at one end to said fueling conduit at a point downstream from said control conduit, and connected at the other end to said fueling conduit at a point upstream of said orifice; and a defueling pump disposed in said defueling conduit.

References Cited in the file of this patent
UNITED STATES PATENTS

| | | |
|---|---|---|
| 1,725,374 | Rush | Aug. 20, 1929 |
| 1,960,831 | Shand | May 29, 1934 |
| 2,291,731 | Lake et al. | Aug. 4, 1942 |
| 2,507,597 | Holdridge | May 16, 1950 |
| 2,569,554 | Buttolph | Oct. 2, 1951 |
| 2,847,023 | Hansen | Aug. 12, 1958 |